(12) United States Patent
Huff et al.

(10) Patent No.: US 8,091,946 B2
(45) Date of Patent: Jan. 10, 2012

(54) SCREWLESS VISOR MOUNT ASSEMBLY

(75) Inventors: David Huff, Waterford, MI (US); Shane DeVoe, Ortonville, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 559 days.

(21) Appl. No.: 12/214,207

(22) Filed: Jun. 17, 2008

(65) Prior Publication Data

US 2009/0309384 A1 Dec. 17, 2009

(51) Int. Cl.
*B60J 3/02* (2006.01)

(52) U.S. Cl. .................................. 296/97.9; 296/97.13

(58) Field of Classification Search .................. 296/97.1, 296/97.9, 97.12, 97.13
See application file for complete search history.

(56) References Cited

U.S. PATENT DOCUMENTS

| | | | | |
|---|---|---|---|---|
| 5,031,954 A | * | 7/1991 | Peterson et al. | 296/97.9 |
| 5,056,853 A | * | 10/1991 | Van Order | 296/97.9 |
| 5,062,608 A | * | 11/1991 | Phelps et al. | 248/289.11 |
| 5,082,322 A | | 1/1992 | Cekander et al. | |
| 5,242,204 A | * | 9/1993 | Kitterman et al. | 296/97.9 |
| 5,314,227 A | | 5/1994 | Weiland et al. | |
| 5,451,022 A | * | 9/1995 | Peterson | 248/289.11 |
| 5,468,041 A | * | 11/1995 | Viertel et al. | 296/97.9 |
| 5,486,033 A | * | 1/1996 | Lecorvaisier et al. | 296/97.13 |
| 5,499,854 A | * | 3/1996 | Crotty et al. | 296/97.13 |
| 5,544,927 A | | 8/1996 | Snyder et al. | |
| 5,765,897 A | * | 6/1998 | Snyder et al. | 296/97.9 |
| 5,829,817 A | | 11/1998 | Ge | |
| 5,857,728 A | * | 1/1999 | Crotty, III | 296/97.9 |
| 6,003,928 A | | 12/1999 | Curtindale | |
| 6,015,126 A | | 1/2000 | Murdock | |
| 6,021,986 A | | 2/2000 | Murdock | |
| 6,079,685 A | | 6/2000 | Jacquemin | |
| 6,179,366 B1 | | 1/2001 | Hansz | |
| 6,220,645 B1 | | 4/2001 | Jacquemin | |
| 6,231,109 B1 | | 5/2001 | Beaver | |
| 6,234,558 B1 | * | 5/2001 | Curtindale | 296/97.9 |
| 6,250,708 B1 | * | 6/2001 | Kurachi | 296/97.9 |
| 6,322,126 B1 | | 11/2001 | Kraus | |
| 6,336,672 B2 | | 1/2002 | Beaver | |
| 6,340,193 B1 | * | 1/2002 | Sawayanagi | 296/97.9 |
| 6,368,009 B1 | | 4/2002 | Noda | |
| 6,398,295 B2 | | 6/2002 | Asai | |
| 6,428,078 B1 | * | 8/2002 | Beaver | 296/97.9 |
| 6,450,561 B2 | | 9/2002 | Asai et al. | |
| 6,491,333 B2 | | 12/2002 | Ichikawa et al. | |
| 6,511,029 B2 | * | 1/2003 | Sawayanagi | 248/224.8 |
| 6,517,039 B1 | * | 2/2003 | Arisaka | 248/231.81 |
| 6,595,571 B1 | * | 7/2003 | Krebs et al. | 296/97.9 |
| 6,607,233 B1 | | 8/2003 | Beaver et al. | |
| 6,629,717 B1 | * | 10/2003 | Wilson | 296/97.9 |

(Continued)

*Primary Examiner* — Glenn Dayoan
*Assistant Examiner* — Gregory Blankenship
(74) *Attorney, Agent, or Firm* — Raggio & Dinnin, P.C.

(57) ABSTRACT

A screwless visor for use in a vehicle is disclosed. The visor includes a body, and an arm having a first end and a second end with the second end arranged in the body. The arm also has an elbow arranged near the first end. The visor also includes a mounting assembly secured to the headliner. The mounting assembly includes an inner collar arranged over the first end of the arm and a bracket in contact with the inner collar. The bracket has a hook extending from a surface thereof wherein the hook is in contact with the headliner. The screwless mount assembly will allow for easier installation and removal of the visor from the headliner of the interior of an automotive vehicle.

21 Claims, 5 Drawing Sheets

U.S. PATENT DOCUMENTS

| | | |
|---|---|---|
| 6,659,527 B1 | 12/2003 | Wilson |
| 6,669,263 B2 | 12/2003 | Asai |
| 6,726,165 B2 * | 4/2004 | Sawayanagi et al. ...... 248/224.8 |
| 6,817,583 B2 * | 11/2004 | Wilson ....................... 248/231.9 |
| 6,830,279 B2 | 12/2004 | Beaver |
| 6,863,331 B2 | 3/2005 | Beaver et al. |
| 6,880,877 B2 | 4/2005 | Sawayanagi et al. |
| 6,896,311 B2 * | 5/2005 | Schultz et al. ............... 296/97.9 |
| 7,293,824 B2 * | 11/2007 | Dobson ........................ 296/214 |
| 7,325,854 B2 * | 2/2008 | Lanser et al. ................. 296/97.9 |
| 7,419,206 B2 * | 9/2008 | Slobodecki et al. ......... 296/97.9 |
| 7,575,267 B2 * | 8/2009 | Nakajima et al. ............ 296/97.9 |
| 2002/0175535 A1 * | 11/2002 | Beaver ......................... 296/97.9 |
| 2005/0156448 A1 * | 7/2005 | Schultz et al. ............... 296/97.9 |
| 2007/0120390 A1 * | 5/2007 | Wheeler et al. .............. 296/97.9 |
| 2008/0150316 A1 * | 6/2008 | Welter ......................... 296/97.9 |
| 2009/0309384 A1 * | 12/2009 | Huff et al. .................... 296/97.9 |

* cited by examiner

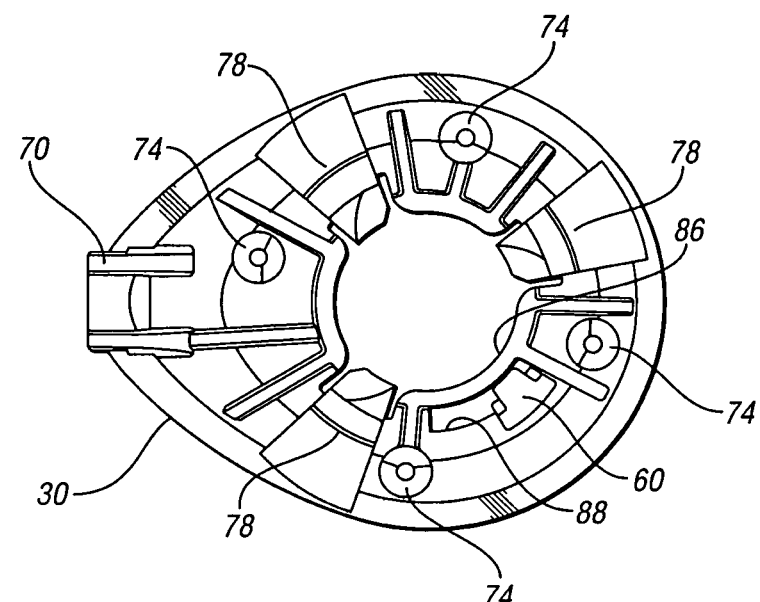
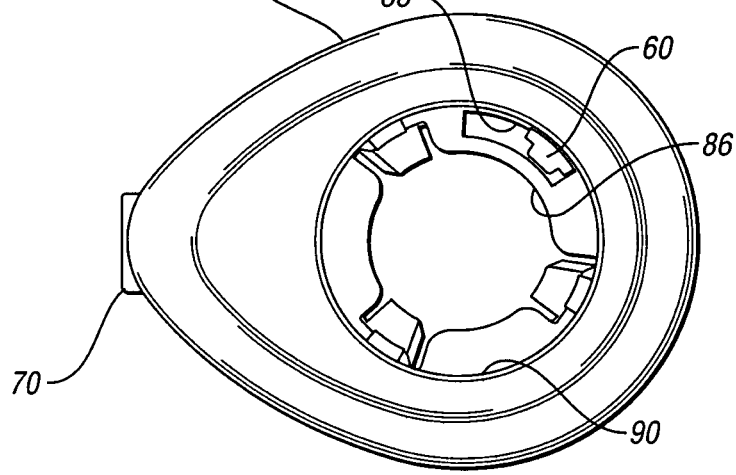
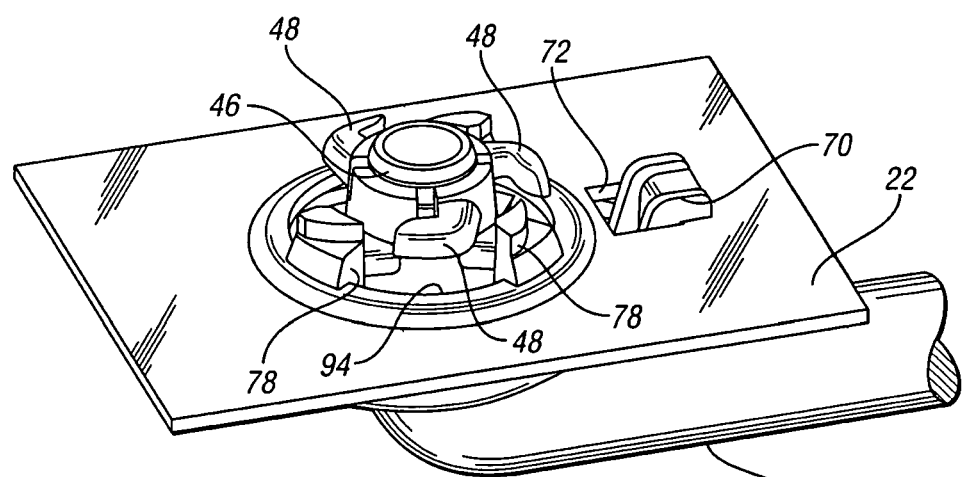

SCREWLESS VISOR MOUNT ASSEMBLY

BACKGROUND OF THE INVENTION

1. Field of the Invention

This subject invention generally relates to a sun visor for use in an interior of a vehicle and more particularly relates to a visor for use in an interior of an automotive vehicle that has a screwless mount assembly for rotatably mounting the visor to the headliner of the vehicle.

2. Description of Related Art

Sun visors are well known and widely used, and a great many designs have been successfully employed in vehicles over the years. Manufacturers have developed a variety of ways by which visor bodies and other interior components may be constructed and mounted in a vehicle. The advantages in these designs, however often can add to complexity in the manufacturing process for interior components of the vehicle. There has been and continues to be a premium in the automotive industry on cost saving and improvements in the efficiency and speed of manufacturing processes along with an increase awareness and focus on the interior of a vehicle being easier to insert components therein by persons working on a manufacturing line.

Generally, an area of particular focus in automobile technology has been reducing the number and complexity of steps required to assemble interior components, such as visors into the interior of a vehicle. Many visors are constructed with a clam shell design that involves two plastic shell halves which are in the form of a visor body and have an upholstery covering placed thereover. A visor arm is arranged within the visor body and then mounted via a visor mounting assembly to the headliner of the vehicle via screws or other types of fasteners. The construction of these prior art visors and installation into the vehicles is relatively time intensive. Elimination of parts and steps in the assembly and installation in the vehicle can reduce the expense of manufacturing and installing the visor within the vehicle. It is thus desirable to provide a design where a component, such as the mounting assembly, can be secured relatively quickly within the vehicle and manufactured easily in manufacturing plants.

Therefore, there is a need in the art for a sun visor that is capable of being installed into an interior of a vehicle without the use of screws or fasteners for holding a mount assembly of the visor to the headliner of the vehicle. Furthermore, there is a need in the art for a sun visor that is capable of being removed from the headliner in a time efficient manner. There also is a need in the art for an easy to manufacture and low cost sun visor that is capable of being easily installed within an interior of numerous types of motor vehicles. There also is a need in the art for a sun visor mounting assembly that has a reduced number of parts that allows for an easier to manufacturer and assemble mounting assembly that reduces the time to install the sun visor assembly within the motor vehicle on the manufacturing line.

SUMMARY OF THE INVENTION

One object of the present invention may be to provide an improved sun visor for use in a vehicle.

Another object of the present invention may be to provide a screwless mounting assembly for a sun visor for use in a vehicle to reduce the complexity of the installation process of the visor within the vehicle.

Still another object of the present invention may be to provide a low cost and easier to manufacture visor for use in a vehicle.

Still another object of the present invention may be to provide a sun visor that does not require screws or fasteners to install in the vehicle thus reducing installation time of the visor.

Still another object of the present invention may be to provide a screwless mounting assembly for a visor within a vehicle that is also easy to remove from the vehicle.

Yet another object of the present invention may be to provide a mounting assembly for a sun visor that includes an arm, a bracket, and an inner collar all working in interrelation with one another to provide for a rotatable sun visor system.

Still another object of the present invention may be to provide an inner collar of a mounting assembly that has a plurality of ears thereon for use in removing the mounting assembly from the vehicle with the use of a removal tool.

To achieve the foregoing objects, a screwless visor mounting assembly for use in a vehicle interior is disclosed. The screwless mount assembly includes an arm and an inner collar arranged over an end of the arm. The assembly further includes a bracket in contact with the inner collar and a bracket having a hook arranged near an outer periphery thereof. The inner collar includes a rib extending from an end thereof and a cam extending from an outer surface thereof. The inner collar also includes an ear extending from an outer surface thereof. The bracket includes a snap lock for securing the inner collar thereto and a plurality of flexible fingers and bosses for interacting with the sheet metal or headliner of the automotive vehicle. The mounting assembly is also capable of being removed from the vehicle headliner via a removal tool.

One advantage of the present invention may be that it provides a novel and improved visor for use in the interior of a vehicle.

Still a further advantage of the present invention may be that it allows for a visor to have a screwless mount assembly for reducing the complexity and time needed for installation of the visor within the vehicle interior.

Yet another advantage of the present invention may be that it provides a low cost and easier to manufacture and install visor for use in an automotive vehicle.

Yet a further advantage of the present invention may be that it provides a visor that is capable of being easily installed and removed from the vehicle interior without the use of fasteners.

Still another advantage of the present invention may be that it provides a screwless visor mounting assembly that includes an inner collar, a bracket and an arm.

Yet another advantage of the present invention may be that the inner collar uses a plurality of ears to allow for easy removal of the mounting assembly from the vehicle headliner.

Other objects, features and advantages of the present invention will become apparent from the subsequent description and the appended claims, taken in conjunction with the accompanying drawings.

BRIEF DESCRIPTION OF THE DRAWINGS

FIG. 8 shows a bottom view of a bracket according to the present invention.

FIG. 9 shows a top view of a bracket according to the present invention.

FIG. 10 shows the screwless mounting assembly of the present invention installed within the headliner of a vehicle.

DESCRIPTION OF THE EMBODIMENT(S)

Figure 1:
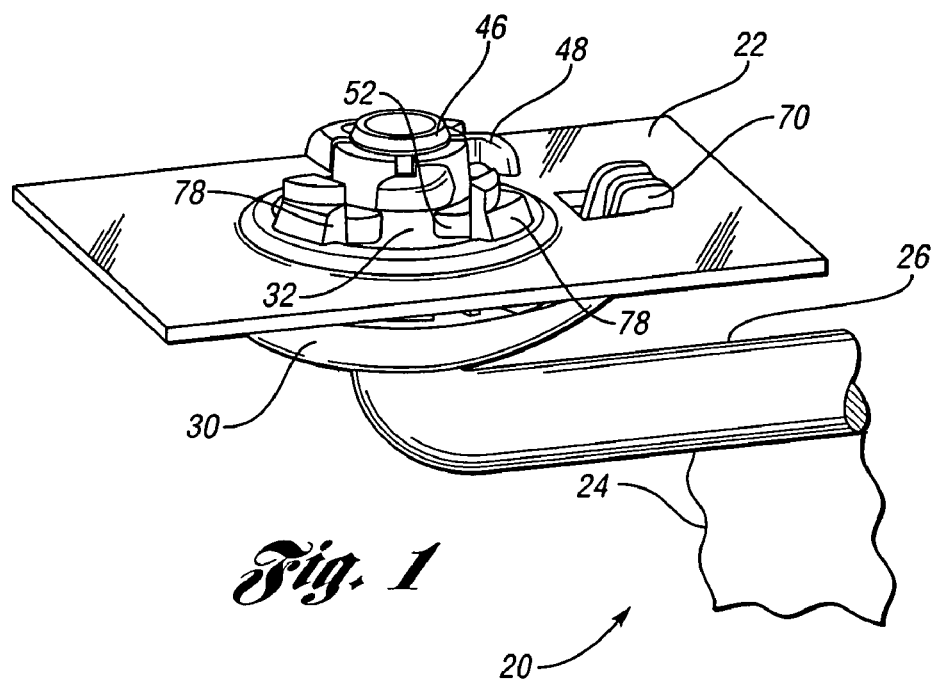
FIG. 1 shows a visor with a screwless mounting assembly according to the present invention.
Figure 2:
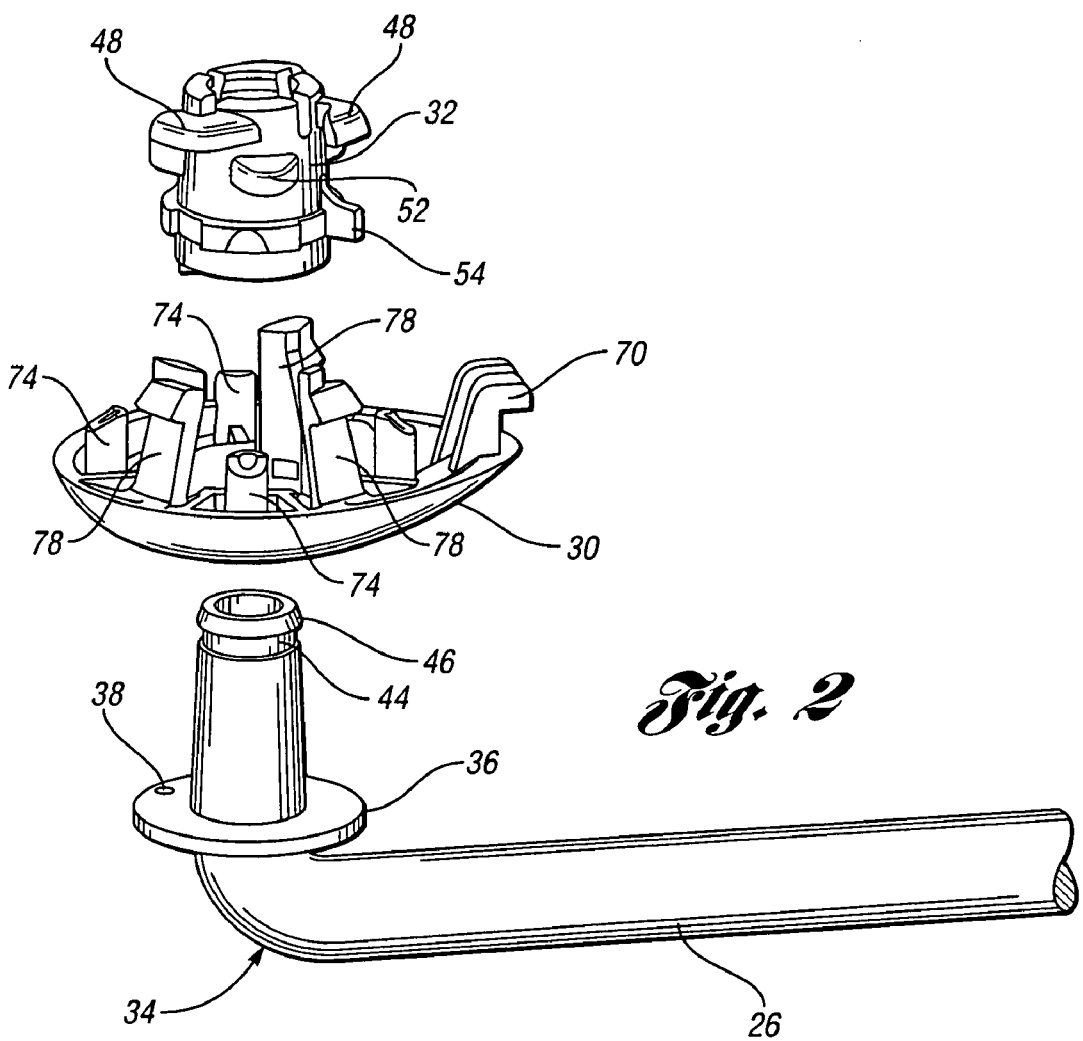
FIG. 2 shows an exploded view of the screwless mounting assembly according to the present invention.

Referring to the drawings, a visor 20 for use in the interior of a vehicle compartment is shown. It should be noted that the visor 20 of the present invention can be used in any known vehicle, such as air, water, automobile, space, or any other type of vehicle that has the need for a visor 20 to block exterior sun from infiltrating the interior cabin of the vehicle thus distracting the driver or passengers in such vehicles. The visor 20 generally is arranged in the vehicle, such as an automotive vehicle, and connected to an interior compartment roof or headliner 22 of the vehicle in a rotatable manner. The headliner 22 may include sheet metal and the associated upholstery covering thereover. The visor 20 is capable of being folded down into a use position and then stored up against the roof 22 of the interior of the vehicle in a stored position. The visor 20 is also rotatable between a front window and a side window of the vehicle. The visor 20 also may be capable of sliding with relation to the arm of the present invention and stop at certain positions and be held in certain positions using technology previously disclosed and claimed by the Applicant.

FIGS. 1 through 12 generally show a visor 20 according to the present invention as it used in an automotive vehicle interior. The visor 20 shown in FIGS. 1 through 12 generally includes a visor body 24 that may be formed of two half shells or molded as one piece, depending on the design requirements of the visor 20. It should be noted that any known method may be used to make the visor body 24 and not just that disclosed in FIG. 1. The visor body 24 may have any known shape or may include accessories such as but not limited to mirrors, lights, ticket clips, adjustable flaps, map straps, D-rings, or any other type of accessories that allow for multiple uses and positions of the visor 20 within the automotive vehicle. Arranged within the visor body 24 may be a visor arm 26 according to the present invention. The visor arm 26 may be capable of sliding with respect to the visor body 24 in some contemplated embodiments and is also capable of rotating with respect to the visor body 24 in some contemplated embodiments. A screwless mounting assembly 28, is secured to the interior roof or headliner 22 of the automotive vehicle and rotatably supports one end of the arm 26 for the visor 20 according to the present invention. It should also be noted that the visor 20 may include a finished upholstered cover over a top thereof or may have a finished outer surface that creates an aesthetically pleasing visor 20 for use within the vehicle interior wherein visor outer surface is molded with a predetermined pattern thereon.

The screwless mounting assembly 28 generally includes the arm 26, a bracket 30 and an inner collar 32. The arm 26 generally has an overall L-shape when viewed from a side. The arm 26 has a first end and a second end. The second end generally is arranged within the visor body 24 of the visor 20 according to the present invention. The first end generally defines a part of the screwless mounting assembly 28 according to the present invention. An elbow 34 generally defines the L-shape of the visor arm 26 according to the present invention. The elbow 34 transitions the arm 26 between the first end of the arm 26 and the second end of the arm 26. The visor arm 26 may be made of any material such as but not limited to metal, plastic, ceramic, composites, or any other known natural material. The visor arm 26 may also be a hollow tube or a solid rod structure depending on the design requirements of the automotive vehicle visor 20. The arm 26 generally includes a ring like shoulder 36 extending from an outer surface thereof near the first end of the arm 26. The shoulder 36 is arranged a predetermined distance from the first end of the visor arm 26. The shoulder 36 may include an orifice 38 through a surface thereof wherein the orifice 38 creates an access hole for a removal tool or pin 40 for removing the screwless visor mount assembly 28 from the vehicle headliner 22. The orifice 38 generally is circular in shape, however any other shape may also be used. The arm 26 includes a rib or extension 42 extending from a surface of the shoulder 36 of the arm 26 near the first end. This extension 42 comes in contact with the inner collar 32 to allow for the inner collar 32 to be moved or rotated during installation of the mounting assembly 28 within the vehicle headliner 22. The first end of the arm 26 also may include a circumferential groove 44 around an entire outer surface thereof. The groove 44 is a predetermined distance from the first end of the arm 26. The groove 44 extends a predetermined distance into the outer surface of the arm 26. A lip 46 extends around the entire outer circumference of the first end of the arm 26.

Figure 3:
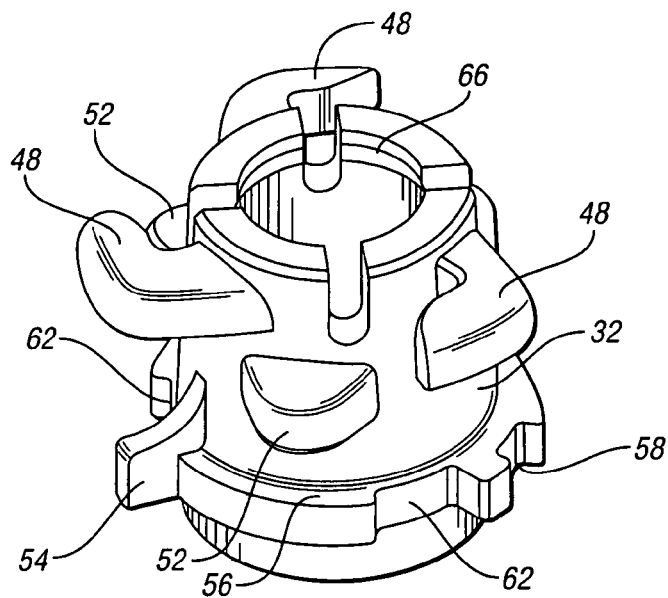
FIG. 3 shows a plan view of an inner collar according to the present invention.
Figure 4:
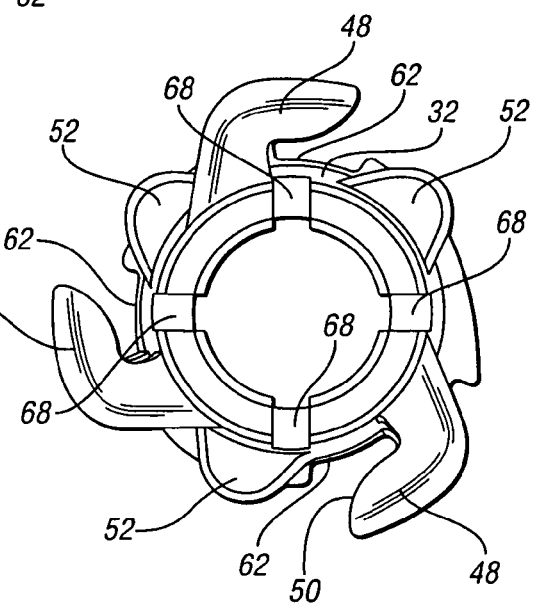
FIG. 4 shows a top view of an inner collar according to the present invention.
Figure 5:
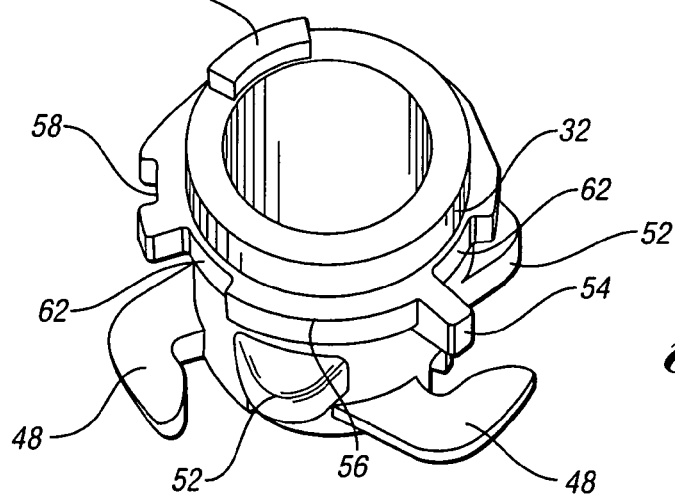
FIG. 5 shows a bottom view of an inner collar according to the present invention.
Figure 6:
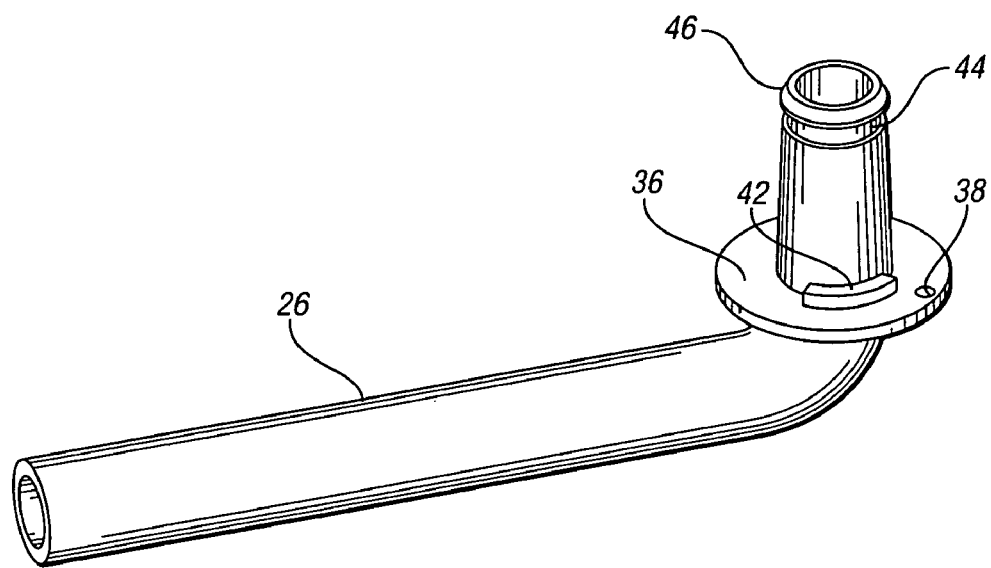
FIG. 6 shows a plan view of an arm according to the present invention.
Figure 7:
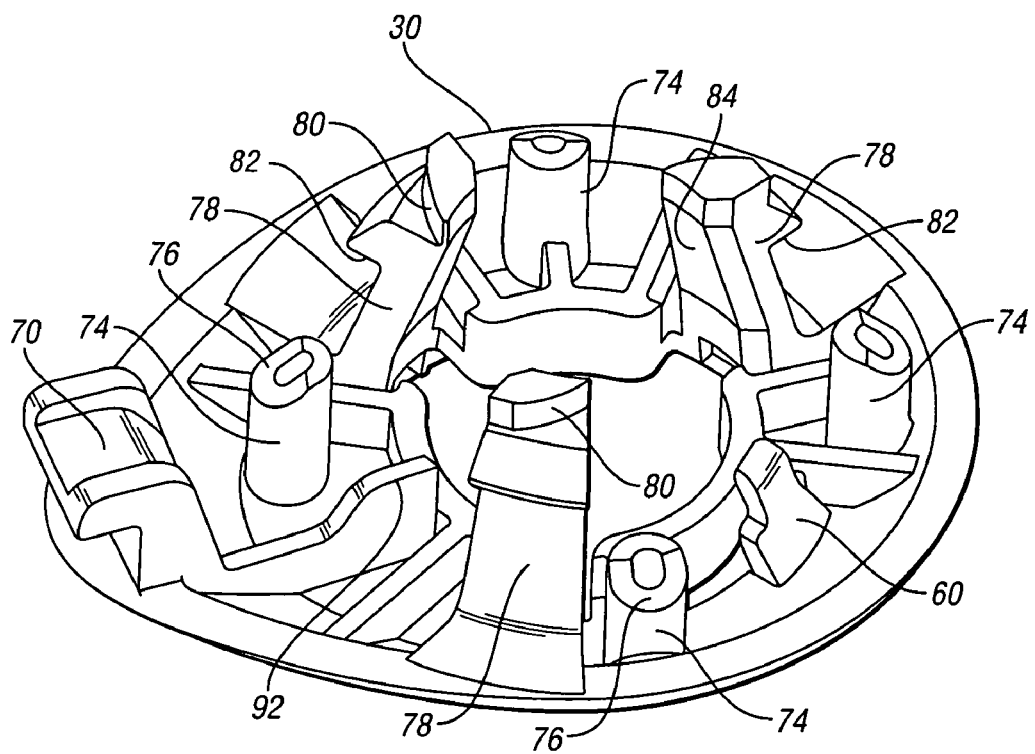
FIG. 7 shows a plan view of a bracket according to the present invention.
Figure 11:
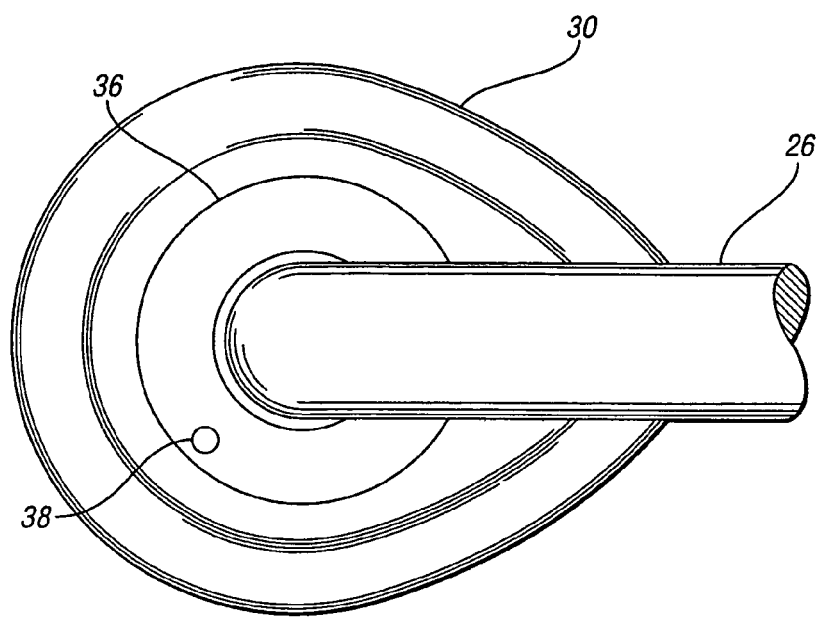
FIG. 11 shows a perspective view of a screwless mounting assembly according to the present invention.
Figure 12:
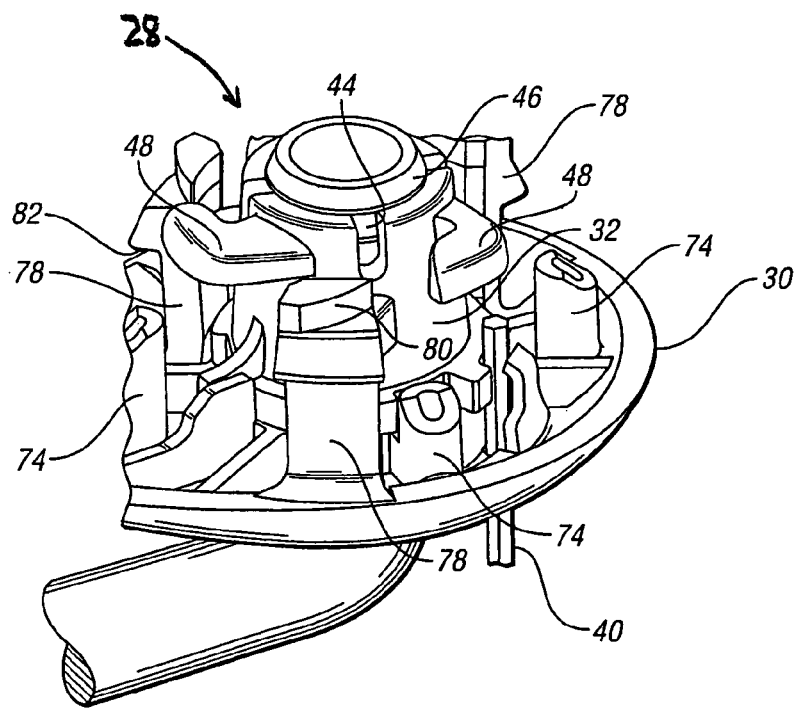
FIG. 12 shows a removable tool arranged within the screwless mounting assembly for removal of the mounting assembly from a vehicle headliner according to the present invention.

The inner collar 32 generally has a tube like shape with an inner bore arranged therethrough. The diameter of the inner bore of the inner collar 32 generally will be approximately the same or slightly smaller than the outer diameter of the first end of the arm 26. This allows for the arm 26 to rotate with relation to the inner collar 32 during normal operation of the visor 20 in the vehicle. It should be noted that the inner collar 32 generally is made from a hard plastic material, however any other metal, ceramic, composite or other known material along with any natural material may also be used for the inner collar 32. The inner collar 32 includes a plurality of ear members 48 extending from an outer surface thereof. The ear members 48 generally have an L-shape when viewed from above as shown in FIG. 4. The ears 48 may have a predetermined curved shape on an inner surface 50 thereof which will interact with the bracket 30 during removal of the screwless mounting assembly 28 from the vehicle interior. In the embodiment shown three ears 48 are arranged around the outer surface of the inner collar 32 however any other number of ears may also be used depending on the design requirements of the inner collar 32. The ears 48 may be orientated in any direction from the outer surface of the inner collar 32. The inner collar 32 also includes a plurality of cam members 52 extending from an outer surface of the inner collar 32. Generally, the ears 48 are arranged near a top end of the outer surface of the inner collar 32 while the cams 52 are arranged near a middle portion of the outer surface of the inner collar 32 and below the ears 48 on the outer surface of the inner collar 32. The cams 52 may have any shape, however, generally the shape is that of a semi-circular hump or knob extending therefrom as shown in FIGS. 3, 4 and 5. It should be noted that any shape can be used for the cams 52 as long as it is capable of engaging with the bracket 30. The inner collar 32 also may include a stop rib 54 extending from an outer surface of the inner collar 32. The stop rib 54 generally is arranged near the bottom of the inner collar 32. The inner collar 32 also has a ring like extension or shoulder 56 extending from an outer surface thereof generally around the entire outer surface at a predetermined distance from the bottom end of the inner collar 32. This circumferential ring 56 may include a locking notch 58 therein. The locking notch 58 is used to retain the inner collar 32 and keep the inner collar 32 from turning or rotating with respect to the bracket 30 when installation of the screwless mounting assembly 28 is complete. The locking notch 58 generally will have any known shape that is complimentary to a lock snap member 60 of the bracket 30. A plurality of assembly or installation notches 62, which allow for the inner collar 32 to be arranged and assembled within the bracket 30, are arranged around an outer surface of the inner collar 32. Generally, these notches are arranged within the circumferential ring like extension 56 arranged near the bottom of the outer surface of the inner collar 32. These notches 62 may have any known shape. The inner collar 32 also may include a rib 64 extending from the bottom end of the inner collar 32. The rib 64 has a predetermined size and length and will allow for the inner collar 32 to engage the arm 26 to allow for rotation of the inner collar 32 with respect to the bracket 30 until the bracket 30 is secured to the inner collar 32 after complete installation of the mounting assembly 38 and visor 20 to the headliner 22 of the vehicle interior. The inner collar 32 also includes a radially inward extending locking ridge 66 extending from an inner surface near a top end of the inner collar 32. The locking ridge 66 interacts and engages with the groove 44 on the first end of the arm 26 thus securing the arm to the inner collar 32 during normal use of the visor 20 within the vehicle interior. This securing of the visor arm 26 to the inner collar 32 allows for rotation of the visor arm 26 with respect to the inner collar 32, thus allowing for the visor 20 to be rotated between a front window and a side window of the vehicle to block the sun where appropriate. The top end of the inner collar 32 also may include a plurality of grooves 68 therein.

The mounting assembly 28 also includes a bracket 30. The bracket 30 is generally made of a plastic material, however any other metal, ceramic, composite, rubber, natural material or any other known material may also be used for the bracket 30 according to the present screwless visor mounting assembly 28. The bracket 30 may have any known shape wherein the shape as shown in the present embodiment is that of generally a tear drop. The bracket 30 includes a hook 70 arranged near one end of the bracket 30. In the embodiment shown it is arranged near the narrower end of the bracket 30. The hook 70 generally has a L-shape when viewed in cross section. The hook 70 will be used to interact with an orifice 72 in the sheet metal of the headliner 22 of the vehicle. The bracket 30 also may include a plurality of bosses 74 extending from an inner surface thereof. The bosses 74 generally have the form of tubular members with a predetermined angled face 76 on the end of the tubular members. However, it should be noted that any other shaped members including solid members may be used for the bosses 74. The bosses 74 will be used to inner engage with and contact with the sheet metal 22 when the bracket 30 is in its installed position. In the embodiment shown four bosses 74 are arranged in a predetermined pattern from the inner surface of the bracket 30, however any other number of bosses 74 may also be used depending on the design requirement of the vehicle in which the visor mounting assembly 28 will be used. The bracket 30 also includes a plurality of flexible fingers 78 extending from an inner surface thereof. The flexible fingers 78 will be capable of engaging with and securing the bracket 30 to the sheet metal 22 in conjunction with the bosses 74. The flexible fingers 78 also may include a predetermined angled groove 80 at a top end thereof. This predetermined angled groove 80 may be used to interact with the ears 48 of the inner collar 32 to allow for removal of the screwless mounting assembly 28 from the vehicle interior headliner 22 if need be. The flexible fingers 78 may also include a locking surface 82 arranged at a predetermined distance from the top of the flexible fingers 78 that will allow for the locking surface 82 to contact the headliner sheet metal 22 when the mounting assembly 28 is in its fully installed and locked position. The flexible fingers 78 may also have a bearing surface 84 on an inner surface thereof that will interact and mate with the cams 52 of the inner collar 32 to urge the flexible fingers 78 in an radially outward direction such that the locking surfaces 82 will engage with the headliner sheet metal 22 to secure the bracket 30 to the sheet metal 22. The bracket 30 also may include a lock snap member 60 that will be used to secure the inner collar 32 to the bracket 30 in a rotational manner. This will ensure that during operation of the visor 20 in the vehicle the bracket 30 and inner collar 32 are rotatably fixed with relation to one another thus allowing for the visor arm 26 alone to rotate with respect to the bracket 30 and inner collar 32 to the proper position to block the sun within the vehicle interior. The bracket 30 also includes a predetermined size and shaped orifice 86 through a predetermined portion thereof. The orifice 86 generally has a circular shape, however any other known shape may also be used for the orifice 86. Directly adjacent to the orifice 86 is a predetermined shaped slot 88 that will allow a removal tool 40 to flex and move the snap lock member 60 out of engagement with the inner collar 32 for easy removal of the mounting assembly 28 from the vehicle interior. The outer surface of the bracket 30 includes a circumferential cavity 90 generally centered around the orifice 86 through the bracket 30. The circumferential cavity 90 will receive the ring like shoulder 36 of the arm 26 and allow for the ring like shoulder 36 of the arm 26 to be rotatably arranged within the outer surface of the bracket 30 while creating an aesthetically pleasing look to the user of the vehicle for the outer bracket surface of the mounting assembly 28 of the visor 20. It should be noted that any other shaped cavity may be used depending on the overall shape of the ring like shoulder portion 36 of the visor arm 26. The bracket 30 may also include a stop rib 92 arranged at a predetermined position with relation to the hook 70. In one contemplated embodiment shown in FIG. 7 the stop rib 92 will be directly adjacent and aligned with a predetermined portion of the hook 70. This stop rib 92 will interact with a stop rib 54 of the inner collar 32 to ensure proper positioning of the inner collar 32 with relation to the bracket 30 and to ensure that the snap lock member 60 of the bracket 30 interacts with the locking notch 58 of the inner collar 32.

In operation the screwless mounting assembly 28 for the visor 20 of the present invention operates like any other mounting assembly for a visor. The assembly 28 allows for the visor 20 to be rotated between a front window and a side window in the vehicle interior to block the sun from entering at different angles to the driver or passengers of the vehicle. The installation of the mounting assembly 28 and visor 20 into the vehicle is greatly reduced in complexity and removes the use of any fasteners or screws thus decreasing the time of installation and reducing the costs to the manufacturer. The installation of the visor 20 into the headliner 22 of the vehicle may occur in any number of methodologies but one methodology contemplated is as follows. First, the inner collar 32 is secured over the first end of the visor arm 26 such that the outwardly extending ridge 66 of the inner collar 32 engages with the circumferential groove 44 on the visor arm 26. This installation of the locking ridge 66 into the groove 44 of the visor arm 26 will allow for the circumferential lip 46 at the end of the visor arm 26 to engage with a top end surface of the inner collar 32. This will secure the visor arm 26 to the inner collar 32 but still allow for rotation of the visor arm 26 with respect to the inner collar 32. Next the inner collar 32 is arranged within the bracket 30. It should also be noted that the inner collar 32 may be arranged within the bracket 30 prior to insertion of the visor arm 26 depending on the design requirements and manufacturing environment in which the mounting assembly 28 is used. The notches 62 will align with the flexible fingers 78 of the bracket 30 thus allowing for insertion of the inner collar 32 into the bracket 30. Then the hook 70 of the bracket 30 is arranged in a first orifice 72 of the headliner 22. The hook 70 will engage the sheet metal 22 of the headliner 22. In one contemplated embodiment the first orifice 72 is a square orifice through the sheet metal surface. The hook 70 of the bracket 30 engages the sheet metal 22 and then the installer will pivot the bracket 30 about the hook 70, that is engaged with the sheet metal, towards the headliner 22 of the vehicle. This pivoting about the hook 70 will allow for another portion of the mounting assembly 28 to be arranged in a second orifice 94 which is adjacent to the first orifice 72 in the headliner a predetermined distance. This pivoting about the hook 70 will continue until the bosses 74 of the bracket 30 engage with an outer surface of the headliner 22. It should be noted that the hook 70 engages with an inner surface of the headliner 22. Next the installer will rotate the visor arm 26 with relation to the bracket 30 and generally in a horizontal direction with respect to the headliner 22. This rotation will allow for engagement of the inner collar rib 64 with the extension 42 on the shoulder 36 of the visor arm 26. After engagement of the rib 64 with the extension 42 the inner collar 32 will rotate such that the cams 52 will engage with the bearing surfaces 84 of the flexible fingers 78 arranged on the bracket 30. This engagement of the cams 52 with the flexible fingers 78 will urge or flex the flexible fingers 78 in a radially outward direction thus engaging their locking surfaces 82 with the headliner 22. This engagement of the flexible fingers 78 with the inner surface of the sheet metal 22 will secure the mounting assembly 28 to the headliner without the use of fasteners or screws. Thus the flexible fingers 78, via their locking surfaces 82, will engage the inner surface of the headliner while the bosses 74 will engage the outer surface of the headliner, along with the hook 70 engaging an inner surface of the headliner, to create a secure connection for the mounting assembly 28 and bracket 30 to the vehicle headliner without the use of fasteners. The installer will continue to rotate arm 26 and hence the inner collar 32 until the stop rib 54 of the inner collar 32 interacts and engages the stop rib 92 on the bracket 30. This will align the anti rotation snap member 60 of the bracket 30 with the locking notch 58 on the inner collar 32 thus arranging the anti rotation snap member 60 within the locking notch 58 of the inner collar 32 and rotatably fixing the inner collar 32 with respect to the bracket 30 and not allowing any rotation therebetween during normal operation of the visor 20 in the vehicle interior. The locking snap member 60 of the bracket 30 will be urged into a secure connection with the locking notch 58 of inner collar 32. The spatial relation between the extension 42 on the shoulder 36 and rib 42 of the inner collar 32 will allow for complete rotation of the visor 20 between a front windshield and a side window of the vehicle due to the alignment of the stop rib 42 to the hook 70 of the bracket 30. It should be noted that the rotation by the installer of the visor arm 26 after initial engagement of the mounting assembly 28 occurs in a clockwise direction, however it is also contemplated that the mounting assembly 28 may be designed such that the rotation necessary for installation thereof is in a counter clockwise direction. This methodology of installing the screwless visor 20 will greatly reduce the amount of time necessary and the number of parts that the installer must use to install the screwless mounting assembly 28 of the visor 20 within the vehicle. The installer will need no tools during installation of the mounting assembly 28 within the vehicle headliner.

The mounting assembly 28 also allows for the removal or unlocking of the mounting assembly 28 and visor 20 from the headliner 22 if so required. The removal of the visor 20 can occur in many different ways, one contemplated methodology for removal is as follows. First, the uninstaller will insert a removal tool 40 into the access orifice 38 in the shoulder 36 of the visor arm 26. Generally, the removal tool 40 may be in the form of a pin, screw driver, or any other rod like tool member available. The uninstaller will insert the pin 40 into the access hole or orifice 38 and push the pin up until it engages with the locking snap member 60 of the bracket 30 and urges or moves the locking snap member 60 of the bracket 30 in a radially outward direction thus disengaging the locking snap member 60 from the locking notch 58 of the inner collar 32. The uninstaller will leave the removal tool 40 inserted therein which will lock the arm 26 and inner collar 32 to one another thus allowing for the arm 26 and inner collar 32 to function as one unit and for the inner collar 32 to rotate when the arm 26 is rotated. Next the uninstaller will rotate the arm 26 and hence the inner collar 32 such that the ears 48 of the inner collar 32 will engage and contact with the angled surface of the flexible fingers 78 and urge or move the flexible fingers 78 in an inward radial direction thus allowing for disengagement of the flexible fingers 78 from the sheet metal 22 of the headliner and allowing for removal of the mounting assembly 28 from the headliner through the second orifice 94 and then from the first orifice 72. This will allow for easy removal of the mounting assembly 28 with the use of a removal tool 40 by the uninstaller of the manufacturer of the visor. It should be noted that the rotation needed to remove the mounting assembly 28 from the headliner 22 is in a counter clockwise direction thus allowing for engagement of the curved surface of the ear 48 with the curved surface of the flexible fingers 78, however, it is also contemplated that clockwise rotation may also be used to remove the mounting assembly 28 depending on specific location and design requirements thereof. This creates a more cost effective easier to install and remove mounting assembly 28 without the use of fasteners or screws for a vehicle interior. The reduction in weight by the non use of fasteners and the reduction and complexity of installation by the use of no fasteners greatly increases the advantage and usefulness of the screwless mounting assembly 28 compared to those already known in the prior art.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A screwless mount assembly for use with a visor in a vehicle, said assembly including:

an arm, said arm having a ring like shoulder extending from a surface thereof, said shoulder having an orifice therethrough and an extension extending from a surface thereof;

an inner collar arranged over an end of said arm; and a bracket in contact with said inner collar, said bracket having a hook arranged near an outer periphery thereof.

2. The assembly of claim 1 wherein said inner collar having a rib extending from an end thereof.

3. The assembly of claim 1 wherein said inner collar having a cam extending from an outer surface thereof.

4. The assembly of claim 1 wherein said inner collar having a stop rib extending from an outer surface thereof.

5. The assembly of claim 1 wherein said inner collar having an ear extending from an outer surface thereof.

6. The assembly of claim 1 wherein said bracket having a snap lock for securing said inner collar to said bracket.

7. The assembly of claim 1 wherein said bracket having a stop rib, said stop rib interacts with said inner collar.

8. A screwless mount assembly for use with a visor in a vehicle, said assembly including:

an arm;

an inner collar arranged over an end of said arm, said inner collar having a first and second notch on an outer surface thereof; and a bracket in contact with said inner collar, said bracket having a hook arranged near an outer periphery thereof.

9. A screwless mount assembly for use with a visor in a vehicle, said assembly including:

an arm;

an inner collar arranged over an end of said arm; and a bracket in contact with said inner collar, said bracket having a hook arranged near an outer periphery thereof, said bracket having a plurality of flexible fingers.

10. A screwless mount assembly for use with a visor in a vehicle, said assembly including:

an arm;

an inner collar arranged over an end of said arm; and a bracket in contact with said inner collar, said bracket having a hook arranged near an outer periphery thereof, said bracket having a plurality of bosses.

11. A visor for use in a vehicle, the visor is rotatably secured to a headliner of the vehicle, said visor including:

a body;

an arm having a first end and a second end, said second end arranged in said body, said arm having an elbow arranged near said first end; and a mounting assembly secured to the headliner, said mounting assembly including:

an inner collar arranged over said first end of said arm; and a bracket in contact with said inner collar, said bracket having a hook extending from a surface thereof, said hook in contact with said headliner, said bracket having a plurality of bosses, said bosses engage the headliner and/or sheet metal.

12. The visor of claim 11 wherein said bracket having a plurality of fingers, said inner collar having a plurality of cams, said cams urge said fingers in a radially outward direction into engagement with a sheet metal of the headliner.

13. The visor of claim 12 wherein said inner collar having a plurality of ears extending from an outer surface thereof, said ears engage with an angled surface of said fingers to urge said fingers radially inward away from engagement with the sheet metal during removal of said mounting assembly from the headliner.

14. The visor of claim 11 wherein said bracket having a snap lock, said inner collar having a notch in an outer surface thereof, said snap lock engages with said notch to rotatably fix said inner collar to said bracket during operation of the visor.

15. The visor of claim 14 wherein said arm having a ring like shoulder near said first end, said shoulder having an orifice therethrough, said orifice having a removal tool inserted therethrough to allow for removal of said mounting assembly from the headliner, said tool engages and moves said snap lock from engagement with said notch allowing said inner collar to rotate with respect to said bracket.

16. The visor of claim 11 wherein said inner collar having a stop rib, said bracket having a stop rib, said inner collar rotates with respect to said bracket until said stop rib of said inner collar engages said stop rib of said bracket, after said engagement said inner collar is rotatably fixed with relation to said bracket.

17. The visor of claim 11 wherein said inner collar having a plurality of notches which allow for said inner collar to be arranged within said bracket.

18. A visor for use in a vehicle, the visor is rotatably secured to a headliner of the vehicle, said visor including:

a body;

an arm having a first end and a second end, said second end arranged in said body, said arm having an elbow arranged near said first end; and a mounting assembly secured to the headliner, said mounting assembly including:

an inner collar arranged over said first end of said arm, said inner collar having a rib extending from a bottom surface thereof, said arm having a raised surface; and a bracket in contact with said inner collar, said bracket having a hook extending from a surface thereof, said hook in contact with said headliner.

19. A visor for use in a vehicle, the visor is rotatably secured to a headliner of the vehicle, said visor including:

a body;

an arm having a first end and a second end, said second end arranged in said body, said arm having an elbow arranged near said first end; and a mounting assembly secured to the headliner, said mounting assembly including:

an inner collar arranged over said first end of said arm, said inner collar having a radially inward extending locking ridge, said arm having a groove near said first end, said locking ridge interacts with said groove to secure said inner collar to said arm; and a bracket in contact with said inner collar, said bracket having a hook extending from a surface thereof, said hook in contact with said headliner.

20. A method of installing a visor to a headliner of a vehicle without fasteners, said method including the steps of:

arranging a hook of a bracket of a mounting assembly of the visor in a first orifice of the headliner and/or sheet metal;

pivoting said bracket about said hook toward the headliner until a plurality of bosses extending from said bracket engage the headliner and/or sheet metal;

rotating an arm and inner collar of the visor with respect to said bracket until cams of said inner collar engage fingers of said bracket urging said fingers into contact with the headliner and/or sheet metal; and locking said inner collar to said bracket with respect to rotation.

21. The method of claim 20 wherein said step of rotating uses a clockwise or counter clockwise motion.

* * * * *